2,702,291

PROCESS FOR PRODUCING 11α-HYDROXY STEROIDS

Franz Sondheimer, Mexico City, Mexico, Carl Djerassi, Birmingham, Mich., and George Rosenkranz and Octavio Mancera, Mexico City, Mexico, assignors to Syntex S. A., Mexico City, Mexico, a corporation of Mexico No Drawing. Application July 28, 1953, Serial No. 370,855

Claims priority, application Mexico August 2, 1952

17 Claims. (Cl. 260—239.55)

The present invention relates to a novel method for the preparation of cyclopentanophenanthrene derivatives. More particularly, the present invention relates to a novel method for the preparation of steroidal 11α-hydroxy compounds from the corresponding 11-keto compounds.

As is well known, the 11α-hydroxy compounds are valuable intermediates for the production of cortical hormones, for example, 11α-hydroxy progesterone which is produced biochemically from progesterone, has by known methods been utilized for the production of cortisone. Since the biochemical oxidation produces, in general, 11α-hydroxy compounds in many instances, it is desirable to have a method for producing these same compounds synthetically so that the compounds of the present invention are not only useful intermediates, as is well-known, but the present process also presents a useful method for preparing these known compounds.

It is well-known that most of the methods for the reduction of a keto group at position 11 of the steroidal molecule, as for example the reduction with lithium aluminum hydride, produces the corresponding 11β-hydroxy compound. In the United States application of Sondheimer, Djerassi and Rosenkranz, Serial No. 335,586, filed February 6, 1953, there has been described a method for the transformation of certain specific steroidal $\Delta^{8(9)}$-11-keto compounds into the corresponding saturated 11α-hydroxy compounds by treating the same with alkali metal in ammonia solution and in the presence of an alcohol. It was generally considered that this method was only suitable for the production of 11α-hydroxy saturated compounds from the corresponding $\Delta^{8(9)}$-11-keto compounds, particularly of the allo series at C–5.

In accordance with the present invention, the surprising discovery has been made that steroidal 11α-hydroxy compounds may be produced from the corresponding saturated 11-keto compounds irrespective of the configuration and other active positions in the molecule. Particularly, this surprising discovery has been made that the configuration at C–5 has no influence on the course of the present reaction and that the reaction of an 11-keto compound with alkali metal in ammonia solution in the presence of alcohol produces in good yield the corresponding 11α-hydroxy compound whether or not the steroid belongs to the C–5 normal series or the C–5 allo series.

It has been further discovered in accordance with the present invention that other substituents may be present in the molecule and that other substituents, such as a keto group, may be protected from reaction with the reducing agent by the formation of a ketal or a hemithioketal, thereby making possible the selective reduction of the keto group at position 11.

The following equations illustrate typical examples of the application of the present method:

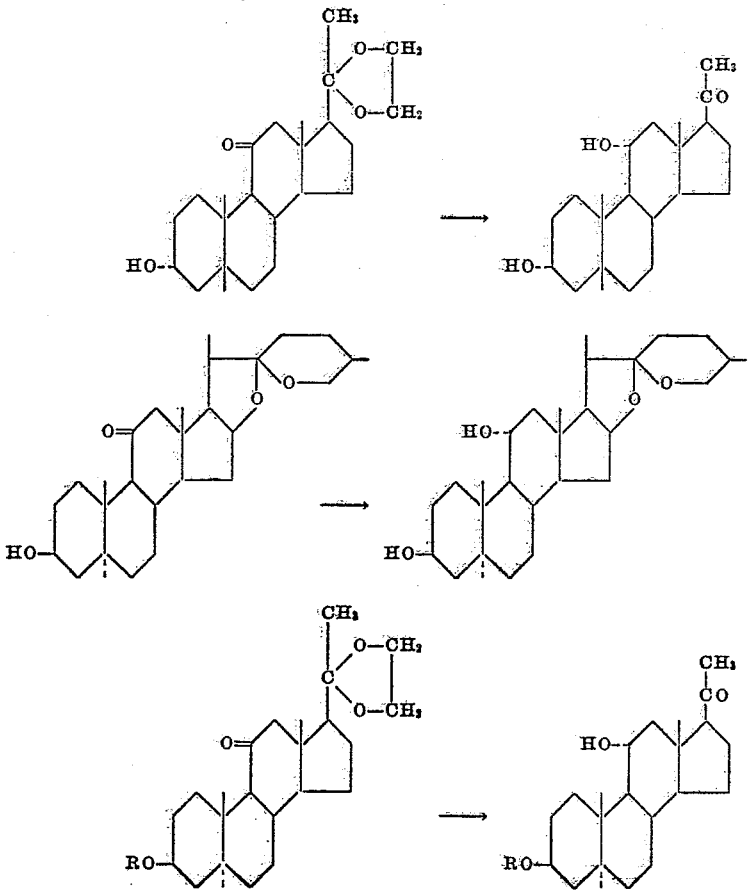

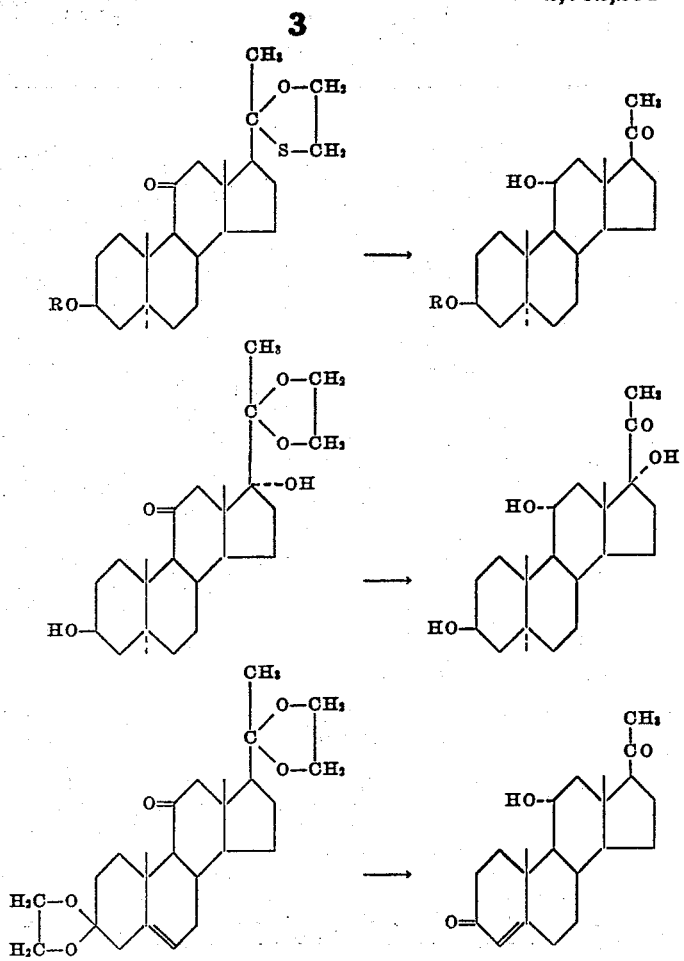

In practicing the method illustrated by the above equations, the steroidal 11-ketone is preferably dissolved in a suitable solvent such as ether together with a small quantity of an alcohol, preferably a lower aliphatic alcohol such as methanol, and is then added to the liquid ammonia. The mixture is then stirred and an alkali metal such as lithium, potassium or sodium added thereto in small portions. After each addition the blue color produced is allowed to disappear before the next portion is added. Ammonium chloride is then added and the ammonia is then evaporated by heating on a steam bath. The product is then purified and the crystalline precipitate, if a ketal, can then be treated as with acid to decompose the ketal. In any event, the corresponding 11α-hydroxy compound is produced in good yield. If the steroid possesses an esterified hydroxy group as is indicated by R in the above equations, then preferably the product is reesterified since the method produces to a certain extent a saponification of esterified hydroxy groups. Preferably R in the above equations represents the esterification residue of any acid normally used for the esterification of steroids alcohols, as for example, R may represent the residue of a lower fatty acid such as acetic or the residue of benzoic acid.

The above equations are intended to represent only typical examples of steroids and it is obvious that other substituents may be present on the basic molecule and other side chains may be present at 16 or 17.

The following specific examples serve to illustrate but are not intended to limit the present invention:

Example I

A solution of 1 g. of the 20-monoethylene ketal of pregnane-3α-ol-11,20-dione having a melting point of 144°–146° C. in 30 cc. of ether and 5 cc. of methanol was added to 100 cc. of liquid ammonia. While the mixture was mechanically stirred, 0.5 g. of lithium metal were added in small portions, waiting for the blue color to disappear before adding the next portion. Then 5 g. of ammoninum chloride were slowly added and the ammonia was evaporated by heating on the steam bath. The residue was diluted with water and the product was extracted with ether and well washed with water until removal of all the ammonia. The ether solution was dried over sodium sulfate, concentrated to 50 cc. and cooled. The crystalline precipitate of the 20-ethyleneketal of pregnane-3α,11α-diol-20-one was filtered, thus giving 0.86 g., melting point 193°–197° C. Recrystallization from acetone-hexane raised the melting point to 199°–200° C., $[\alpha]_D$ +15.83° (chloroform).

740 mg. of the 20-ethyleneketal of pregnane-3α,11α-diol-20-one were dissolved in 50 cc. of anhydrous acetone containing 75 mg. of p-toluenesulphonic acid and the mixture was kept for 24 hours at room temperature. It was then poured into water and the product was extracted with chloroform, washed several times with water, dried over sodium sulfate and evaporated to dryness. Recrystallization of the residue from acetone-hexane yielded 0.65 g. of pregnane-3α,11α-diol-20-one with a melting point of 178°–179° C., $[\alpha]_D$ +88° (chloroform).

Acetylation with acetic anhydride in pyridine by known methods afforded the corresponding diacetate with a melting point of 142°–144° C., $[\alpha]_D$ +61° (chloroform).

Example II

Following the method described in Example I for the reduction of the 20-monoethyleneketal of pregnane-3α-ol-11,20-dione, there was reduced 1 g. of 22-iso-allospirostane-3β-ol-11-one acetate. The resulting product which was difficult to crystallize was directly acetylated by heating for one hour on the steam bath with 3 cc. of acetic anhydride and 2 cc. of pyridine. Isolation by routine methods gave 0.69 g. of 22-iso-allospirostane-3β,11α-diol diacetate with a melting point of 172°–174° C., $[\alpha]_D$ −77° (chloroform), which was identical with an authentic sample.

Example III 1 g. of the 20-monoethyleneketal of allopregnane-3β-ol-11,20-dione acetate (the preparation of which is described in a paper of Djerassi, Batres, Romo and Rosenkranz, Jour. Amer. Chem. Soc., 1952), was treated in exactly the same way as described in Example I, except that sodium metal was used instead of lithium metal. After hydrolizing the ketal and reacetylating, there was obtained allopregnane-3β,11α-diol-20-one diacetate with a melting point of 169°–171° C., [α]D +43° (chloroform) in a yield of 0.7 g.

*Example IV*

1 g. of the 20-monoethylenehemithioketal of allopregnane-3β-ol-11,20-dione acetate (the preparation of which is described in the above mentioned paper of Djerassi et al.) was treated by the same method described in the previous example, thus giving allopregnane-3β,11α-diol-20-one diacetate, identical to the one obtained in accordance with Example III.

*Example V*

1 g. of the 20-monoethyleneketal of allopregnane-3β,17α-diol-11,20-dione was treated in exactly the same way as described in Example I, yielding 0.58 g. of allopregnane-3β,11α,17α-triol-20-one with a melting point of 250°–253° C. Recrystallization from ether raised the melting point to 253°–255° C.

*Example VI*

Starting from 1 g. of Δ⁴-pregnene-3,11,20-trione (11-keto progesterone) there was prepared the 3,20-diethyleneketal by known methods, for example by the method described in the United States application of Dauben, Ringold and Loken, Serial No. 364,216 filed June 25, 1953. 1 g. of the crude 3,20-diethyleneketal was treated in exactly the same way as described in Example I, giving 0.65 g. of Δ⁴-pregnene-11α-ol-3,20-dione (11α-hydroxyprogesterone) with a melting point of 163°–166° C., raised to 166°–167° C. by one recrystallization.

*Example VII*

1 g. of the 3,20-diethyleneketal of Δ⁴-pregnene, 3,11,20-trione was treated by the method described in Example I, except that lithium metal was substituted for potassium metal, giving the same 11α-hydroxyprogesterone in a slightly lower yield than that described in the previous example (0.6 g.).

We claim:

1. A method for the production of steroidal 11α-hydroxy compounds which comprises reducing the corresponding steroidal 11-keto compounds with an alkali metal in ammonia solution and in the presence of an alcohol.
2. The method of claim 1 wherein the alkali metal is lithium.
3. The method of claim 1 wherein the alkali metal is sodium.
4. The method of claim 1 wherein the alkali metal is potassium.
5. The method of claim 1 wherein the steroidal 11α-hydroxy compound has the normal configuration at C–5 and is produced from the corresponding C–5 normal 11-keto compound.
6. The method of claim 1 wherein the steroidal 11α-hydroxy compound possesses the allo configuration at C–5 and is produced from the corresponding 11-keto compound.
7. A method for the selective reduction of a steroidal 11-keto compound having additional keto groups in the molecule which comprises forming a derivative of such additional groups selected from the group consisting of the hemithioketals and ketals thereof, reducing the derivative with an alkali metal in liquid ammonia in the presence of an alcohol to prepare the corresponding steroidal 11α-hydroxy derivative and cleaving said derivative.
8. The method of claim 7 wherein the steroidal compound is a member of the pregnane series.
9. The method of claim 7 wherein the steroidal compound is a member of the allopregnane series.
10. The method of claim 7 wherein the steroidal compound is a member of the normal pregnane series.
11. A method of or the preparation of pregnane-3α,11α-diol-20-one which comprises reducing the 20-monoethyleneketal of pregnane-3α-ol-11,20-dione with lithium metal in solution in ammonia in the presence of methanol, and thereafter cleaving the ketal group.
12. A method for the preparation of 22-isoallospirostan-3β,11α-diol, which comprises reducing 22-isoallospirostan-3β-ol-11-one with lithium metal in solution in ammonia in the presence of methanol.
13. A method for the preparation of allopregnane-3β,11α-diol-20-one which comprises reducing the 20-monoethyleneketal of allopregnane - 3β - ol - 11,20 - dione with sodium metal in solution in ammonia in the presence of methanol and thereafter cleaving the ketal group.
14. A method for the preparation of allopregnane-3β,11α-diol-20-one which comprises reducing the 20-monoethylenehemithioketal of allopregnane-3β-ol-11,20-dione with sodium metal in solution in ammonia in the presence of methanol and thereafter cleaving the ketal group.
15. A method for the preparation of allopregnane-3β,11α,17α-triol-20-one which comprises reducing the 20-monoethyleneketal of allopregnane-3β,17α-diol-11,20-dione with lithium metal in solution in ammonia in the presence of methanol and thereafter cleaving the ketal group.
16. A method for the preparation of Δ⁴-pregnene-11α-ol-3,20-dione which comprises reducing the 3,20-diethyleneketal of Δ⁴-pregnene-3,11,20-trione with lithium metal in solution in ammonia in the presence of methanol and thereafter cleaving the ketal groups.
17. A method for the preparation of Δ⁴-pregnene-11α-ol-3,20-dione which comprises reducing the 3,20-diethyleneketal of Δ⁴-pregnene-3,11,20-trione with potassium metal in solution in ammonia in the presence of methanol and thereafter cleaving the ketal groups.

No references cited.